(12) United States Patent
Byon et al.

(10) Patent No.: US 7,749,313 B2
(45) Date of Patent: Jul. 6, 2010

(54) AIR CONDITIONING SYSTEM FOR AUTOMOTIVE VEHICLES

(75) Inventors: Sang Chul Byon, Daejeon (KR); Sung Ho Kang, Daejeon (KR); Yong Eun Seo, Daejeon (KR); Youn Woo Lim, Daejeon (KR)

(73) Assignee: Halla Climate Control Corp., Deajeon (KR)

( * ) Notice: Subject to any disclaimer, the term of this patent is extended or adjusted under 35 U.S.C. 154(b) by 292 days.

(21) Appl. No.: 12/101,067

(22) Filed: Apr. 10, 2008

(65) Prior Publication Data

US 2008/0251236 A1    Oct. 16, 2008

(30) Foreign Application Priority Data

Apr. 12, 2007   (KR) .................. 10-2007-0035924
Apr. 13, 2007   (KR) .................. 10-2007-0036273
May 8, 2007     (KR) .................. 10-2007-0044606

(51) Int. Cl.
    *B03C 3/41* (2006.01)
(52) U.S. Cl. .................. 96/83; 96/88; 96/95; 96/97; 313/309; 313/351; 361/231
(58) Field of Classification Search .............. 96/29, 96/39, 83, 88, 94–97; 313/309, 351; 62/3.1; 361/225–235
    See application file for complete search history.

(56) References Cited

U.S. PATENT DOCUMENTS

| | | | | |
|---|---|---|---|---|
| 3,957,374 | A * | 5/1976 | Kriese et al. | 356/312 |
| 5,065,272 | A * | 11/1991 | Owen et al. | 361/231 |
| 5,332,425 | A * | 7/1994 | Huang | 96/26 |
| 5,707,429 | A * | 1/1998 | Lewis | 96/63 |
| 6,294,004 | B1 * | 9/2001 | Summers et al. | 96/66 |
| 6,368,392 | B1 * | 4/2002 | Ohtake et al. | 96/65 |
| 6,464,754 | B1 * | 10/2002 | Ford | 95/26 |
| 6,506,238 | B1 * | 1/2003 | Endo | 96/79 |
| 6,508,982 | B1 * | 1/2003 | Shoji | 422/22 |
| 6,635,105 | B2 * | 10/2003 | Ahlborn et al. | 96/28 |
| 6,955,708 | B1 * | 10/2005 | Julos et al. | 95/59 |
| 7,497,898 | B2 * | 3/2009 | Sato et al. | 96/43 |
| 7,553,354 | B2 * | 6/2009 | Borisenko | 96/39 |
| 7,601,204 | B2 * | 10/2009 | Woodruff et al. | 96/30 |

(Continued)

FOREIGN PATENT DOCUMENTS

JP         53-2767 A  *  1/1978  ................ 96/97

(Continued)

*Primary Examiner*—Richard L Chiesa
(74) *Attorney, Agent, or Firm*—Patent Law Group LLP; Carmen C. Cook

(57) ABSTRACT

An air conditioning system for automotive vehicles includes an air conditioning case having an internal passageway and an ionizer for emitting positive ions and negative ions into the internal passageway of the air conditioning case. The ionizer includes a main body and first and second discharge electrodes extending from the main body into the internal passageway in a spaced-apart relationship with each other. The air conditioning system further includes an electric short preventing arrangement for preventing moisture positioned in and around the first and second discharge electrodes from causing electric short between the first and second discharge electrodes. The electric short preventing arrangement comprises a water drainage rib for draining the moisture condensed in and around the first and second discharge electrodes to prevent the electric short between the first and second discharge electrodes.

16 Claims, 21 Drawing Sheets

U.S. PATENT DOCUMENTS

| | | |
|---|---|---|
| 2004/0045442 A1* | 3/2004 | Ziya Ramizovich et al. ... 96/94 |
| 2005/0124286 A1 | 6/2005 | Goldsmith |
| 2007/0034082 A1* | 2/2007 | Adair et al. ............ 96/63 |

FOREIGN PATENT DOCUMENTS

| | | | |
|---|---|---|---|
| JP | 60-18812 | U | 2/1985 |
| JP | 4-114752 | A * | 4/1992 ............ 96/97 |
| JP | 12-247141 | A | 9/2000 |
| JP | 15-187945 | A | 7/2003 |
| JP | 2004-105415 | A | 4/2004 |
| JP | 2005-289177 | A | 10/2005 |
| KR | 2000-0067602 | A | 11/2000 |
| KR | 2004-0073038 | A | 8/2004 |
| KR | 10-2006-0102226 | A | 9/2006 |

* cited by examiner

AIR CONDITIONING SYSTEM FOR AUTOMOTIVE VEHICLES

FIELD OF THE INVENTION

The present invention relates to an air conditioning system for automotive vehicles and, more particularly, to an air conditioning system for automotive vehicles capable of avoiding electric short between first and second discharge electrodes, which would be caused by moisture, and consequently preventing generation of a spark between the first and second discharge electrodes and an otherwise generated discharge noise.

BACKGROUND OF THE INVENTION

An automotive vehicle is provided with an air conditioning system for controlling the temperature of a room air of the vehicle. As shown in FIG. 1, a conventional air conditioning system includes an air conditioning case 10 in which a blower 20 is installed. The blower 20 includes a blower fan 22 and a blower motor 24 for driving the blower fan 22. The blower 20 serves to inhale an external air or an internal air through an external air inlet port 12 or an internal air inlet port 14 of the air conditioning case 10 and then to feed the inhaled air to an internal passageway 16 of the air conditioning case 10.

The air conditioning system further includes an evaporator 30 arranged inside the internal passageway 16 of the air conditioning case 10. The evaporator 30 includes a coolant tube (not shown) through which coolant can flow. The evaporator 30 serves to cool the air passing through the internal passageway 16 and also to introduce the cooled air into a vehicle room, thereby keeping the vehicle room at a pleasant temperature.

The air conditioning system further includes an ionizer 40 for emitting positive ions and negative ions toward the air flowing through the internal passageway 16. As illustrated in FIGS. 1 and 2, the ionizer 40 is installed on the upstream side of the evaporator 30 and includes a main body 42 attached to a side wall of the air conditioning case 10, first and second protection pipes 44 and 45 extending from the main body 42 toward the internal passageway 16 in a spaced-apart relationship with each other, and first and second discharge electrodes 46 and 48 extending through the first and second protection pipes 44 and 45 and protruding into the internal passageway 16.

The first and second protection pipes 44 and 45 are arranged one above the other in such a manner that they penetrate a through-hole 17 formed in the air conditioning case 10 and extend inwardly from a side wall 16a of the internal passageway 16. The first and second discharge electrodes 46 and 48 extend through the first and second protection pipes 44 and 45 and protrude into the internal passageway 16 at their tip ends. The first and second discharge electrodes 46 and 48 are designed to generate negative ions and positive ions by irradiating high voltage pulses into the air flowing through the internal passageway 16.

The negative ions and positive ions generated in the ionizer 40 are introduced into the evaporator 30 to sterilize bacteria and mold living in the evaporator 30 and also to deodorize the air supplied into the vehicle room, thereby enhancing the degree of cleanliness of the air introduced into the vehicle room and creating a comfortable vehicle room environment.

With the air conditioning system referred to above, however, moisture is condensed in and around the first and second discharge electrodes 46 and 48 of the ionizer 40 if the air introduced into the internal passageway 16 has high humidity. The condensed moisture is infiltrated into the first and second discharge electrodes 46 and 48, thus forming a water film which conducts an electric current between the first and second discharge electrodes 46 and 48. The electrical short through the water film causes a spark between the first and second discharge electrodes 46 and 48, consequently generating a discharge noise.

SUMMARY OF THE INVENTION

In view of the above-noted problems, it is an object of the present invention to provide an air conditioning system for automotive vehicles capable of avoiding electric short between first and second discharge electrodes, which would otherwise be caused by ambient moisture.

Another object of the present invention is to provide an air conditioning system for automotive vehicles capable of preventing generation of a spark between first and second discharge electrodes and an otherwise generated discharge noise.

With the above objects in view, the present invention provides an air conditioning system for automotive vehicles, comprising: an air conditioning case having an internal passageway; an ionizer for emitting positive ions and negative ions into the internal passageway of the air conditioning case, the ionizer including a main body and first and second discharge electrodes extending from the main body into the internal passageway in a spaced-apart relationship with each other; and an electric short preventing means for preventing moisture condensed in and around the first and second discharge electrodes from causing electric short between the first and second discharge electrodes.

The electric short preventing means may comprise a water drainage rib for draining the moisture condensed in and around the first and second discharge electrodes to prevent the electric short between the first and second discharge electrodes.

The water drainage rib is adapted to drain the moisture condensed in and around a lower one of the first and second discharge electrodes and is joined to a side wall of the internal passageway so that the condensed moisture can be drained toward the side wall.

In accordance with the present air conditioning system for automotive vehicles, there is provided a structure that prevents formation of a water film between the first and second discharge electrodes. This prevents electric short between the first and second discharge electrodes, which would otherwise generate a spark between the first and second discharge electrodes and a discharge noise. As a consequence, it becomes possible to greatly improve the driving comfortableness.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENTS

Figure 1:
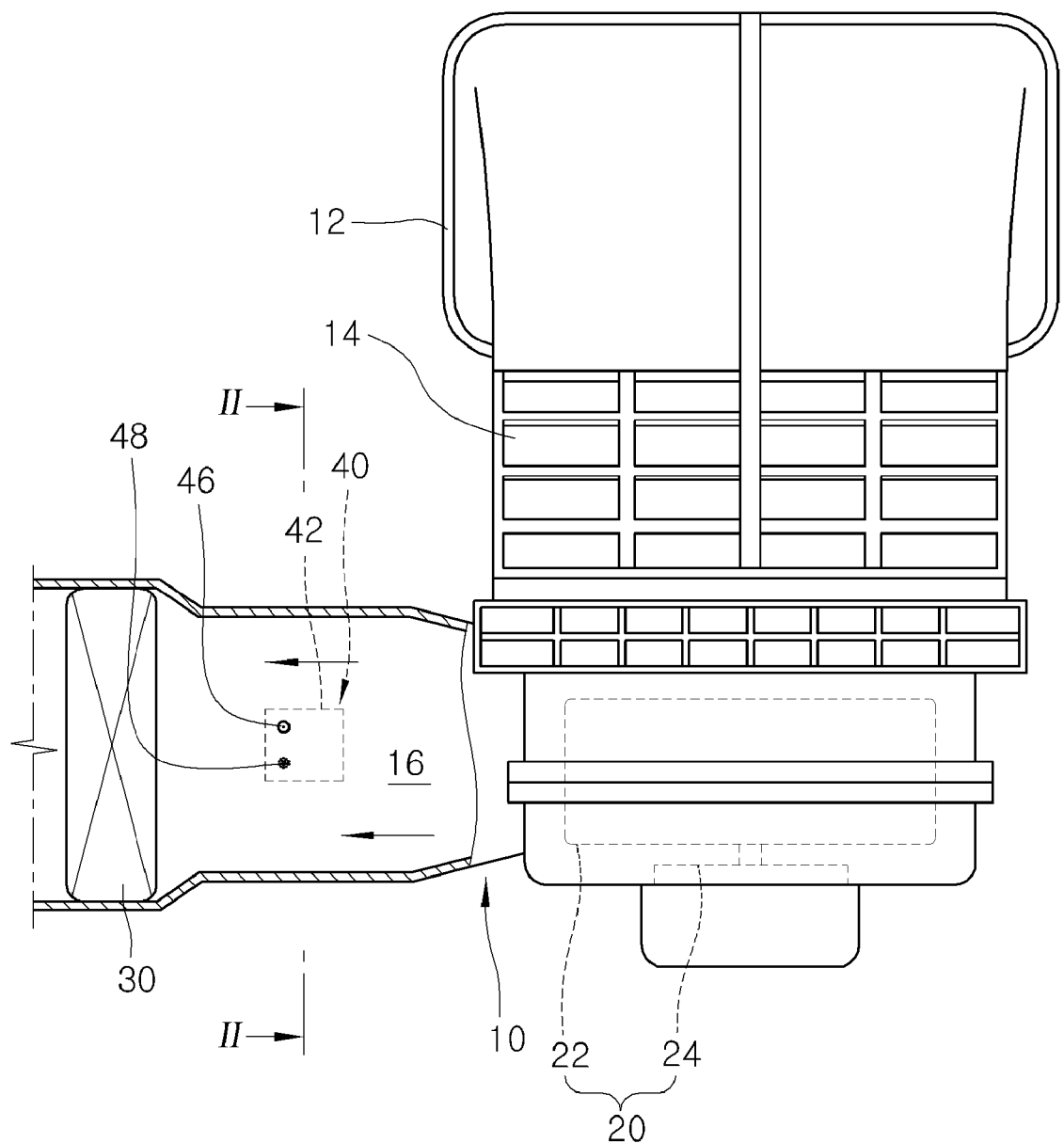
FIG. 1 is a section view showing a prior art air conditioning system.
Figure 2:
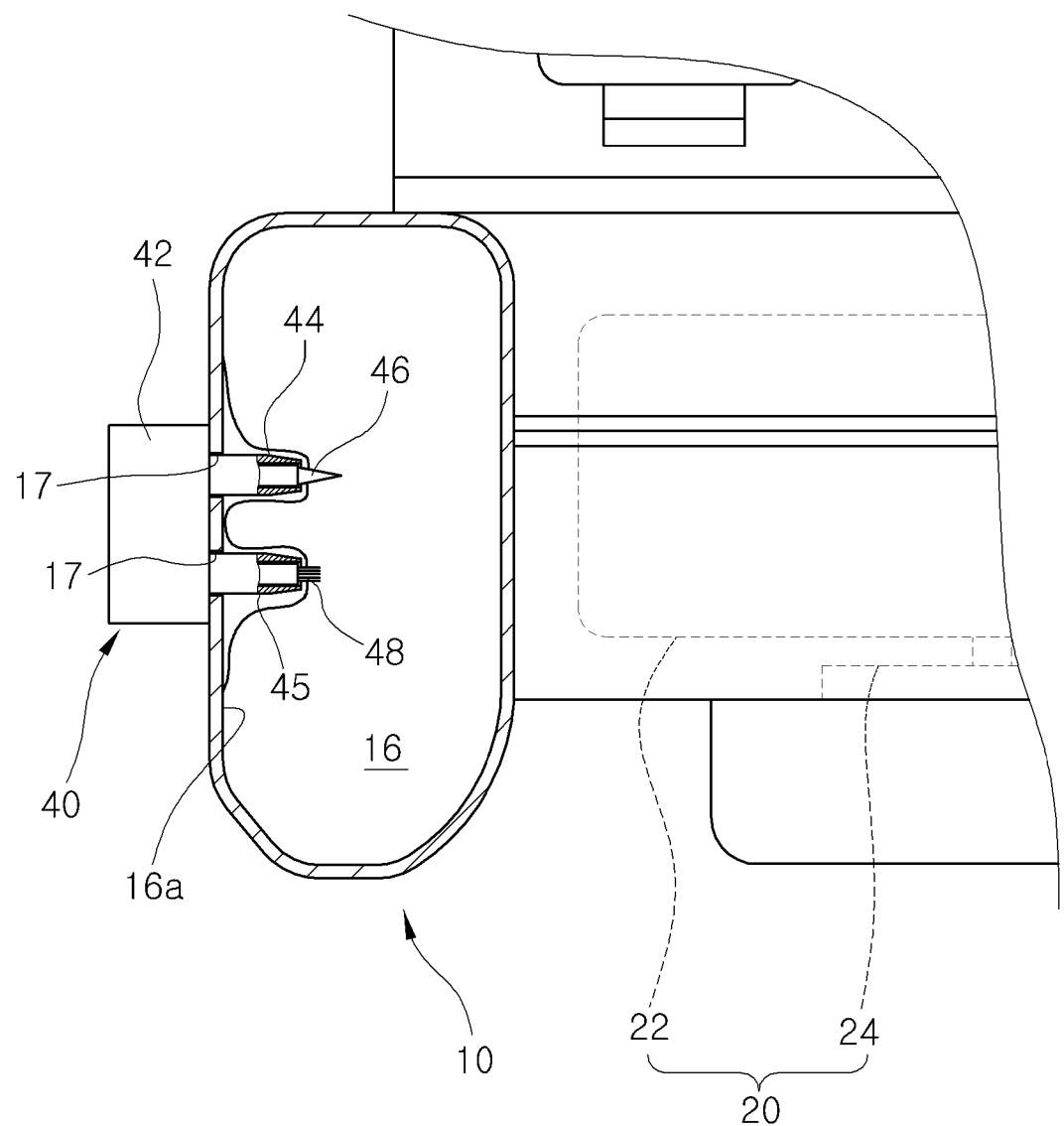
FIG. 2 is a section view taken along line II-II in FIG. 1.

A preferred embodiment of an air conditioning system for automotive vehicles in accordance with the present invention will now be described in detail with reference to the accompanying drawings. The same reference numerals as used in describing the prior art will be used to designate the same elements as those of the prior art.

First Embodiment

Figure 3:
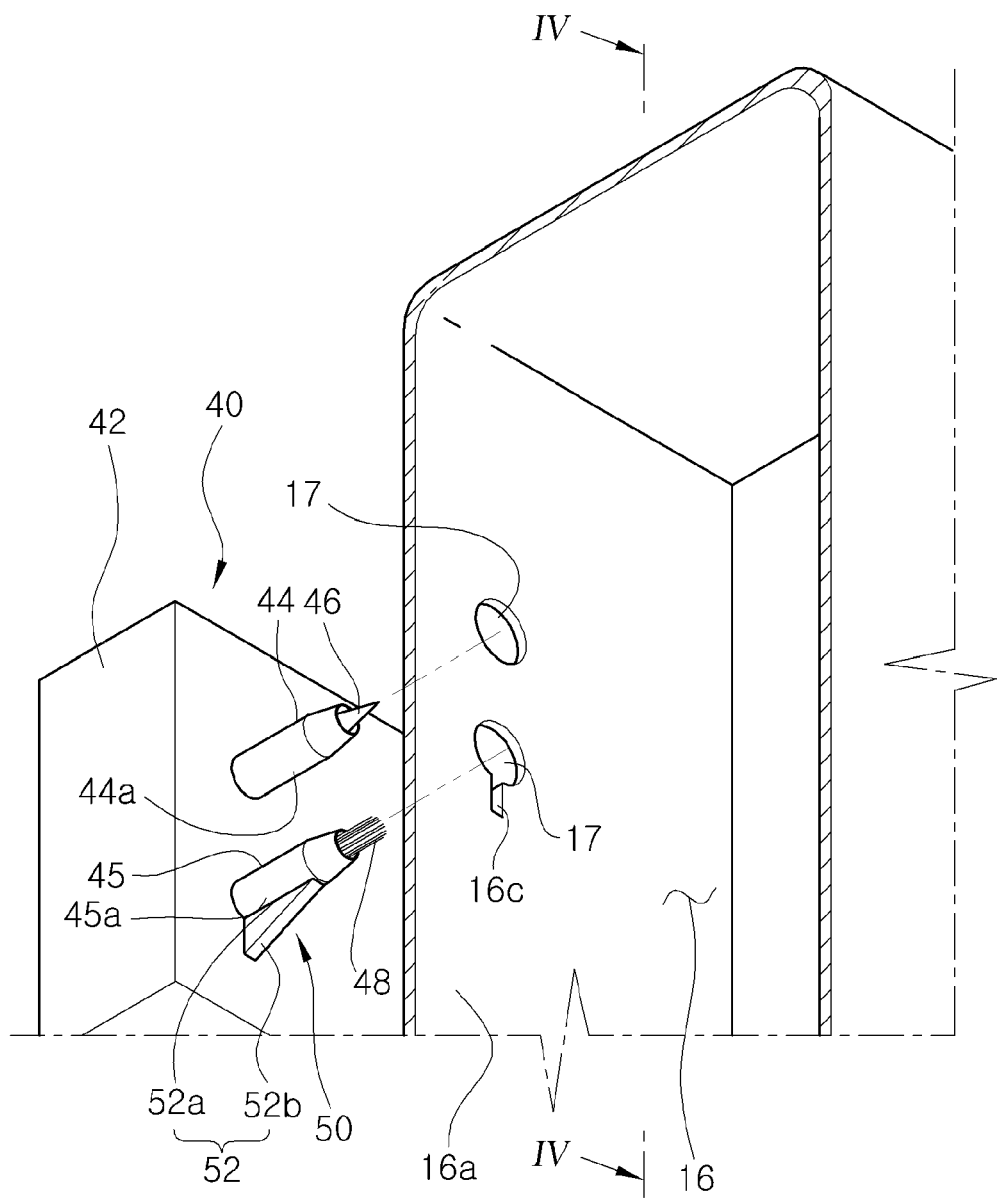
FIG. 3 is a bottom perspective view showing a first embodiment of a means for preventing electric short between first and second discharge electrodes, which is a characterizing part of an air conditioning system for automotive vehicles in accordance with the present invention.
Figure 4:
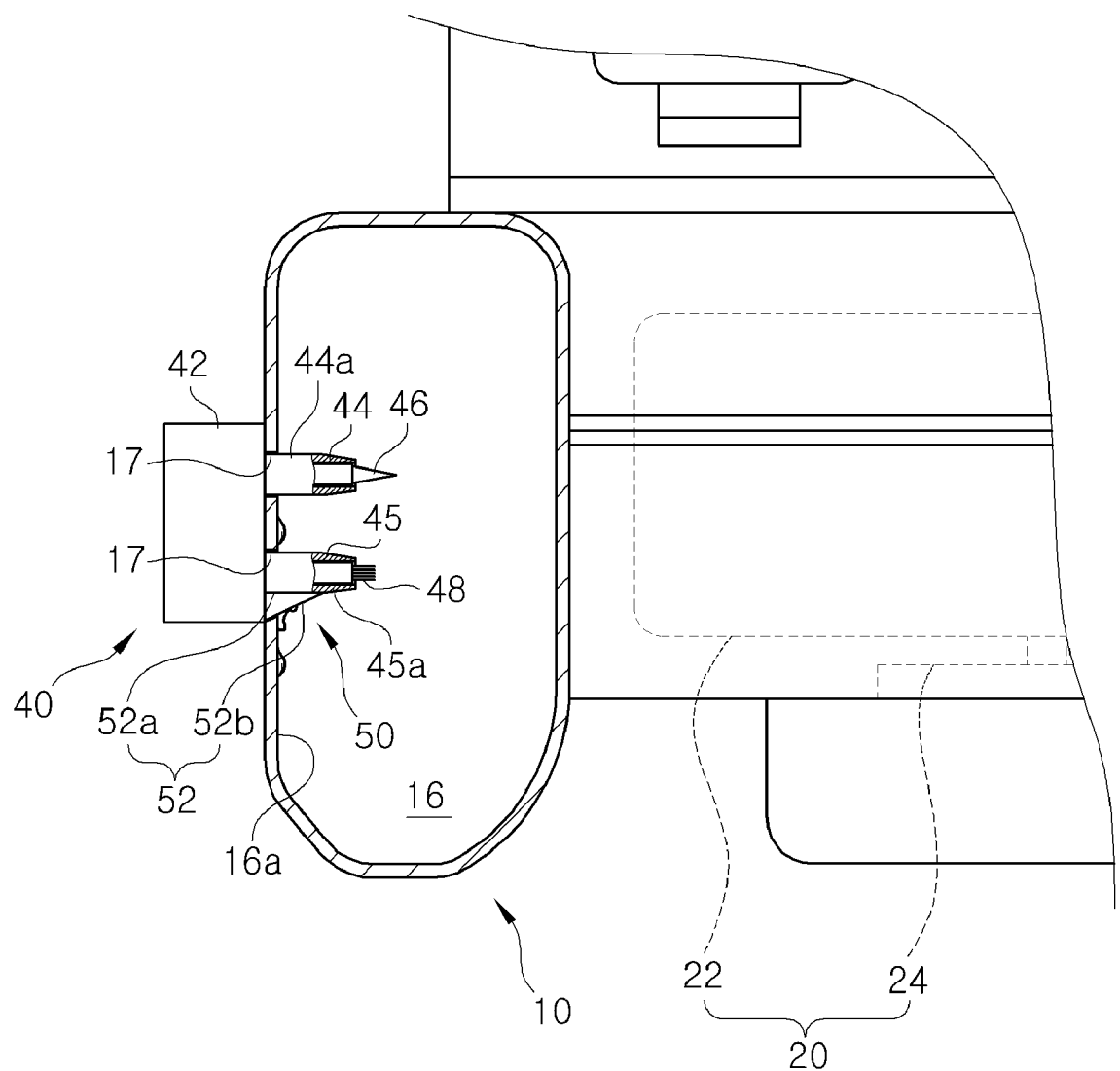
FIG. 4 is a section view taken along line IV-IV in FIG. 3.

FIG. 3 is a bottom perspective view showing a characterizing part of an air conditioning system for automotive vehicles in accordance with the present invention. FIG. 4 is a section view taken along line IV-IV in FIG. 3.

Prior to describing a characterizing part of an air conditioning system for automotive vehicles in accordance with the present invention, a general aspect of the air conditioning system will be described with reference to FIGS. 1, 3 and 4.

The air conditioning system includes an air conditioning case 10 in which a blower 20 is installed. The blower 20 inhales an external air or an internal air through an external air inlet port 12 or an internal air inlet port 14 formed in the air conditioning case 10 and then feed the inhaled air to an internal passageway 16 of the air conditioning case 10.

The air conditioning system includes an evaporator 30 installed within the internal passageway 16 of the air conditioning case 10. The evaporator 30 serves to cool the air passing through the internal passageway 16. The cooled air is introduced into a vehicle room, thereby keeping the vehicle room at a pleasant temperature.

The air conditioning system further includes an ionizer 40 for emitting positive ions and negative ions toward the air flowing through the internal passageway 16. The ionizer 40 is installed on the upstream side of the evaporator 30 and includes a main body 42 attached to an external surface of the air conditioning case 10, first and second protection pipes 44 and 45 extending from the main body 42 toward the internal passageway 16 in a spaced-apart relationship with each other, and first and second discharge electrodes 46 and 48 extending through the first and second protection pipes 44 and 45 and protruding into the internal passageway 16.

The first and second protection pipes 44 and 45 are arranged one above the other in such a manner that they penetrate a through-hole 17 formed in the air conditioning case 10 and extend inwardly from a side wall 16a of the internal passageway 16. The first and second discharge electrodes 46 and 48 extend through the first and second protection pipes 44 and 45 and protrude into the internal passageway 16 at their tip ends. The first and second discharge electrodes 46 and 48 are designed to generate negative ions and positive ions by irradiating high voltage pulses into the air flowing through the internal passageway 16.

Next, the characterizing part of the present air conditioning system will be described in detail with reference to FIGS. 3 and 4.

The air conditioning system of the present invention includes an electric short preventing means 50 for preventing electric short between the first and second discharge electrodes 46 and 48, which would otherwise be caused by moisture. The electric short preventing means 50 includes a water drainage rib 52 designed to drain the moisture existing between the first and second discharge electrodes 46 and 48.

The water drainage rib 52 is comprised of a connection portion 52a connected to a bottom surface 45a of the second protection pipe 45, i.e., the lower one of the first and second protection pipes 44 and 45, and a water drainage portion 52b extending downwardly from the connection portion 52a along a gravitational direction.

As can be seen in FIG. 4, the water drainage portion 52b has a bottom slanting surface inclined toward the side wall 16a of the internal passageway 16. Therefore, the bottom slanting surface is joined to the side wall 16a of the internal passageway 16. Referring to FIG. 3, a reception groove 16c for receiving the water drainage rib 52 of the second protection pipe 45 is formed in the side wall 16a of the internal passageway 16.

In case moisture is condensed in and around the second protection pipe 45, the water drainage rib 52 serves to rapidly drain the condensed moisture in a downward direction. At this time, the condensed moisture is guided toward and drained along the side wall 16a of the internal passageway 16.

In this way, the moisture condensed in and around the second protection pipe 45 is moved toward the base end of the second protection pipe 45 and is prevented from infiltrating into the second discharge electrode 48. This prevents formation of a water film between the first and second discharge electrodes 46 and 48.

Since the formation of a water film between the first and second discharge electrodes 46 and 48 is prevented in this way, it is possible to prevent electric short between the first and second discharge electrodes 46 and 48, which would otherwise generate a spark between the first and second discharge electrodes 46 and 48 and a discharge noise. As a consequence, it becomes possible to greatly improve the driving comfortableness.

Figure 5:
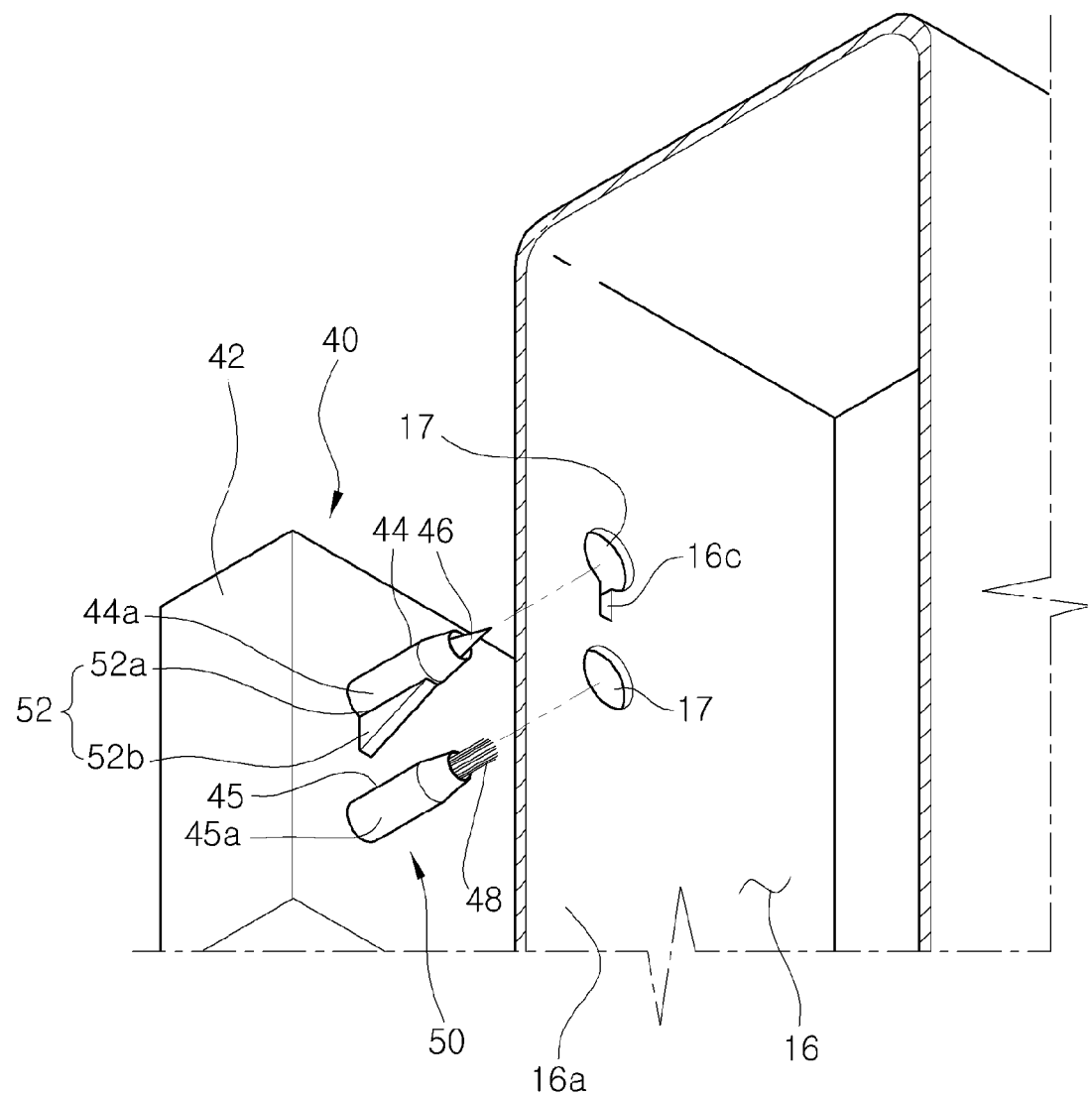
FIGS. 5 to 10 are views illustrating modified examples of a water drainage rib that constitutes the means for preventing electric short between first and second discharge electrodes.

Depending on the circumstances, the water drainage rib 52 may be integrally formed with a bottom surface 44a of the first protection pipe 44 as shown in FIG. 5. As in the foregoing embodiment, the water drainage rib 52 provided in the bottom surface 44a of the first protection pipe 44 serves to downwardly drain the moisture condensed in and around the first protection pipe 44.

Therefore, the moisture is prevented from infiltrating into the first discharge electrode 46 arranged within the first protection pipe 44. This prevents formation of a water film between the first and second discharge electrodes 46 and 48. Accordingly, it is possible to prevent electric short between the first and second discharge electrodes 46 and 48, which would otherwise generate a spark between the first and second discharge electrodes 46 and 48 and a discharge noise.

It is preferred that the water drainage rib 52 be formed on the bottom surface 45a of the second protection pipe 45 rather than the first protection pipe 44. The reason is that, if the water drainage rib 52 is formed in the first protection pipe 44, the moisture drained from the water drainage rib 52 may flow toward the second protection pipe 45 in a large quantity.

Figure 6:
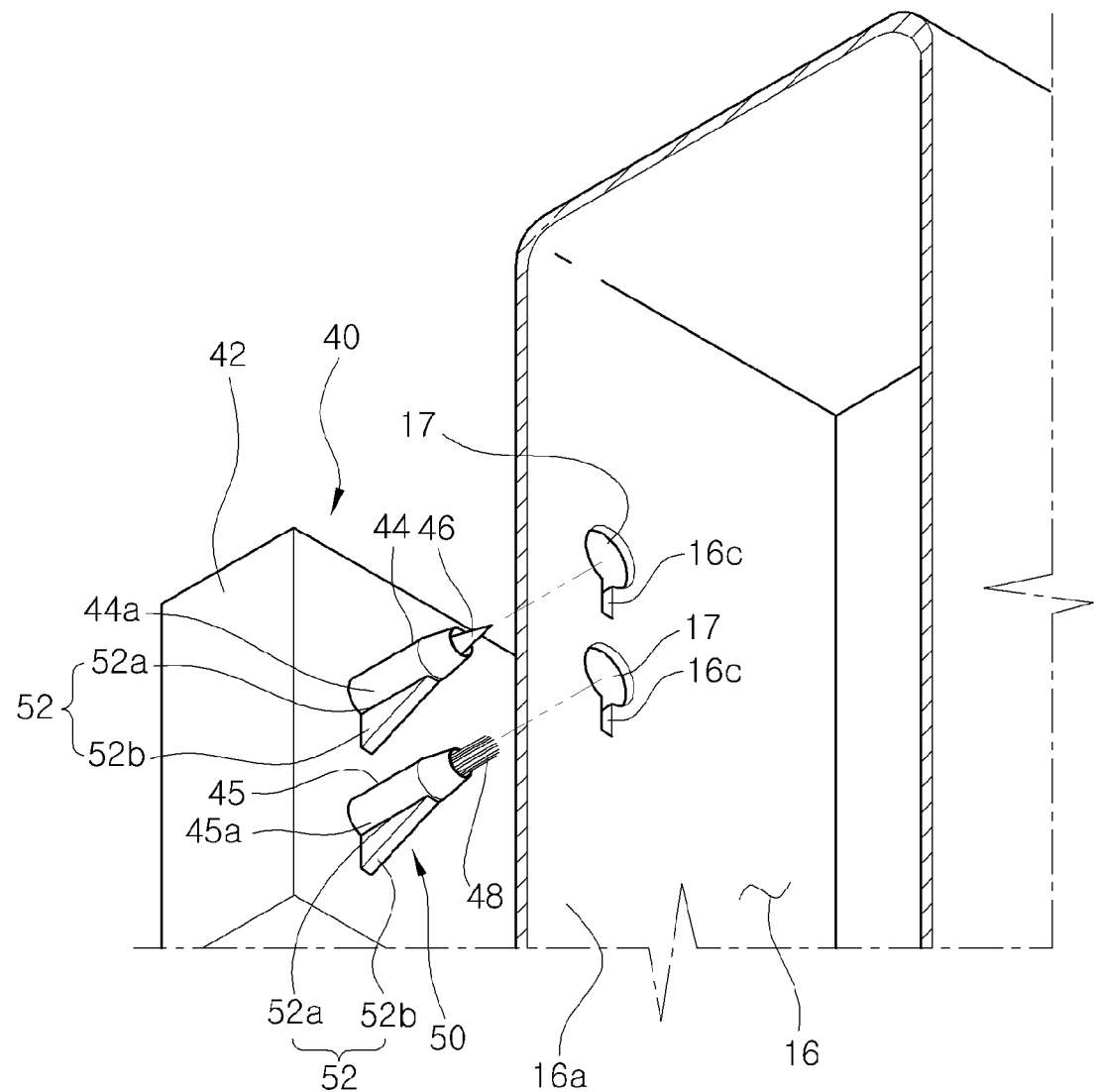

As a further alternative, two water drainage ribs 52 may be formed on the bottom surfaces 44a and 45a of the first and second protection pipes 44 and 45 as illustrated in FIG. 6. In this case, it is possible to drain the moisture condensed in and around the first and second protection pipes 44 and 45.

Figure 7:
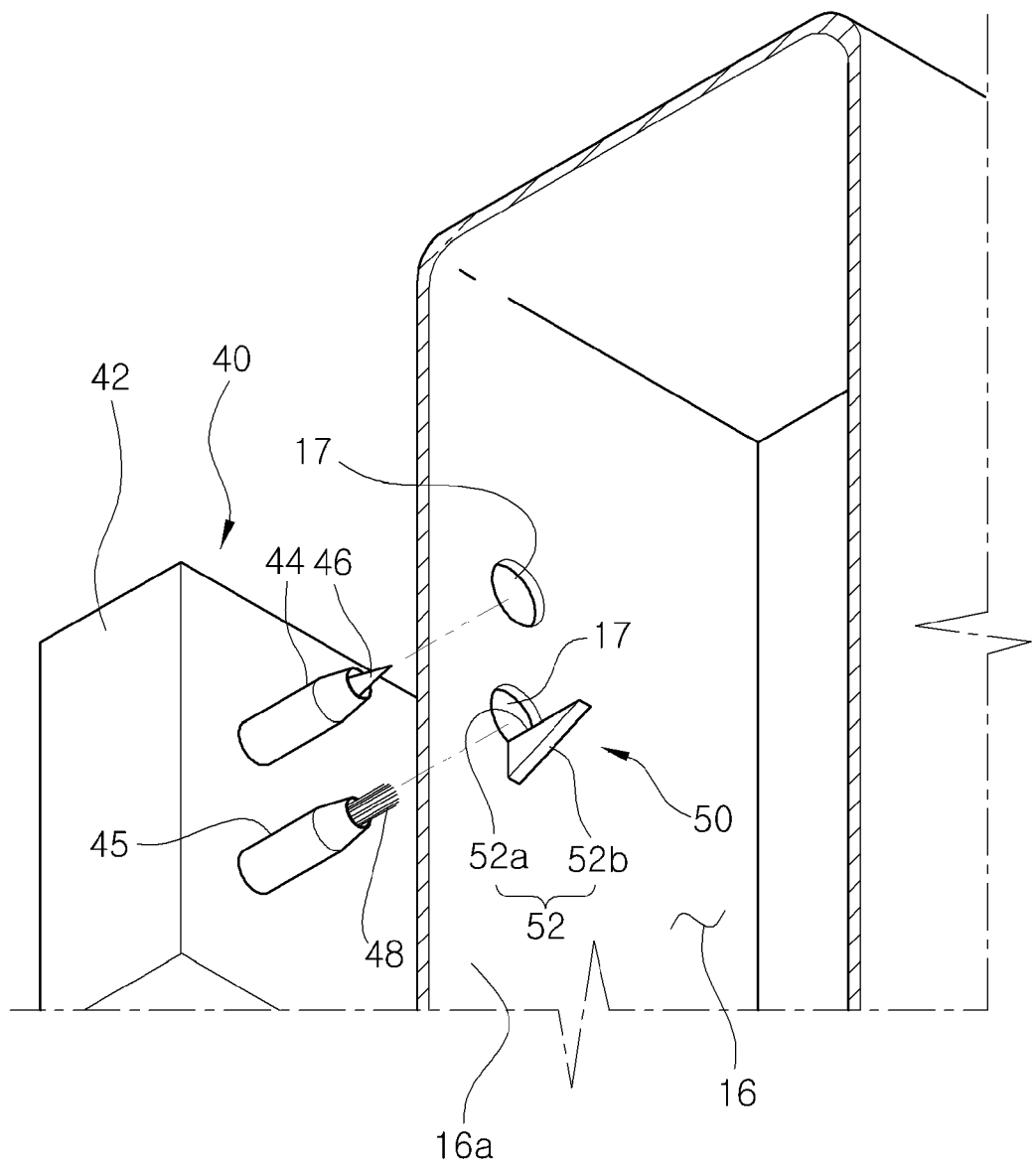
Figure 8:
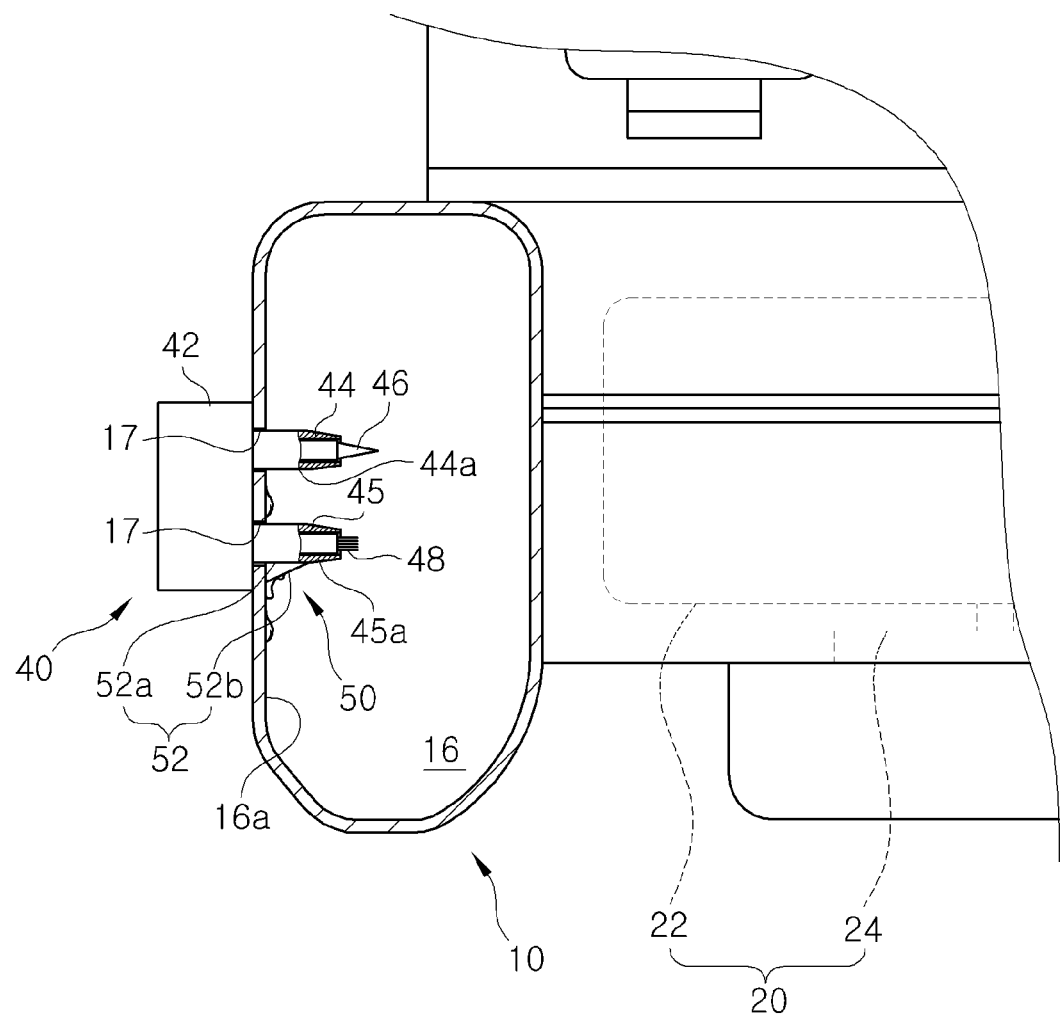

FIGS. 7 and 8 are bottom perspective and section views illustrating a modified example of the water drainage rib 52. Unlike the preceding embodiment, the water drainage rib 52 of this modified example is integrally formed with the side wall 16a of the internal passageway 16. The water drainage rib 52 of this modified example is comprised of a connection portion 52a that makes contact with the bottom surface 45a of the second protection pipe 45 and a water drainage portion 52b extending downwardly from the connection portion 52a along a gravitational direction.

The water drainage rib 52 of this modified example serves to downwardly guide and drain the moisture flowing down from the bottom surface 45a of the second protection pipe 45. In particular, the moisture is guided along the water drainage portion 52b and drained toward the side wall 16a of the internal passageway 16.

Therefore, the moisture condensed in and around the second protection pipe 45 is prevented from flowing toward the tip end of the second protection pipe 45 and infiltrating into the second discharge electrode 48. This prevents formation of a water film between the first and second discharge electrodes 46 and 48.

Figure 9:
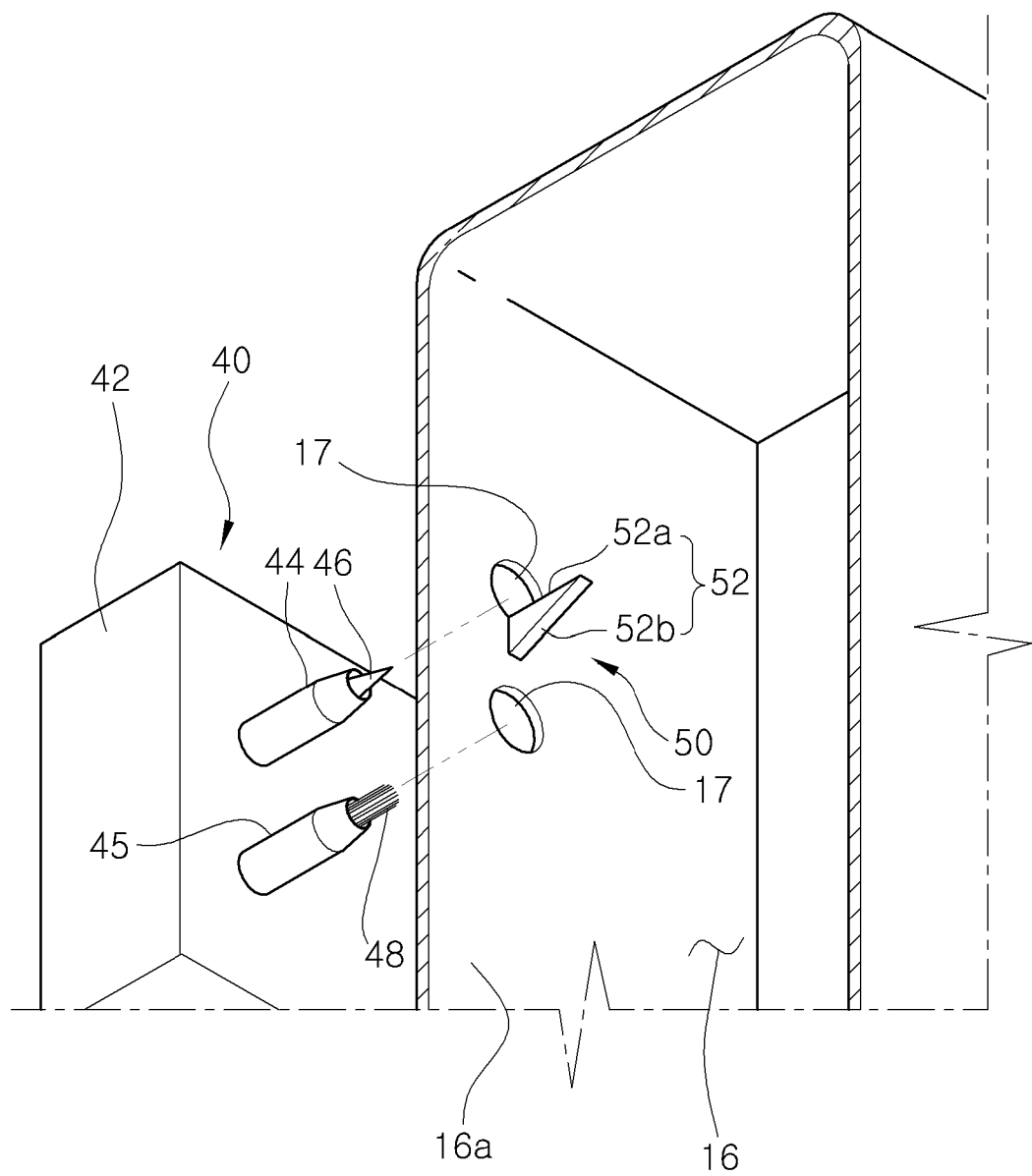

As an alternative, the water drainage rib 52 of this modified example may be arranged below the bottom surface 44a of the first protection pipe 44 as illustrated in FIG. 9. In this case, the water drainage rib 52 serves to downwardly drain the moisture condensed in and around the first protection pipe 44.

Therefore, the moisture condensed in and around the first protection pipe 44 is prevented from infiltrating into the first discharge electrode 46 arranged in the first protection pipe 44. This prevents formation of a water film between the first and second discharge electrodes 46 and 48.

Figure 10:
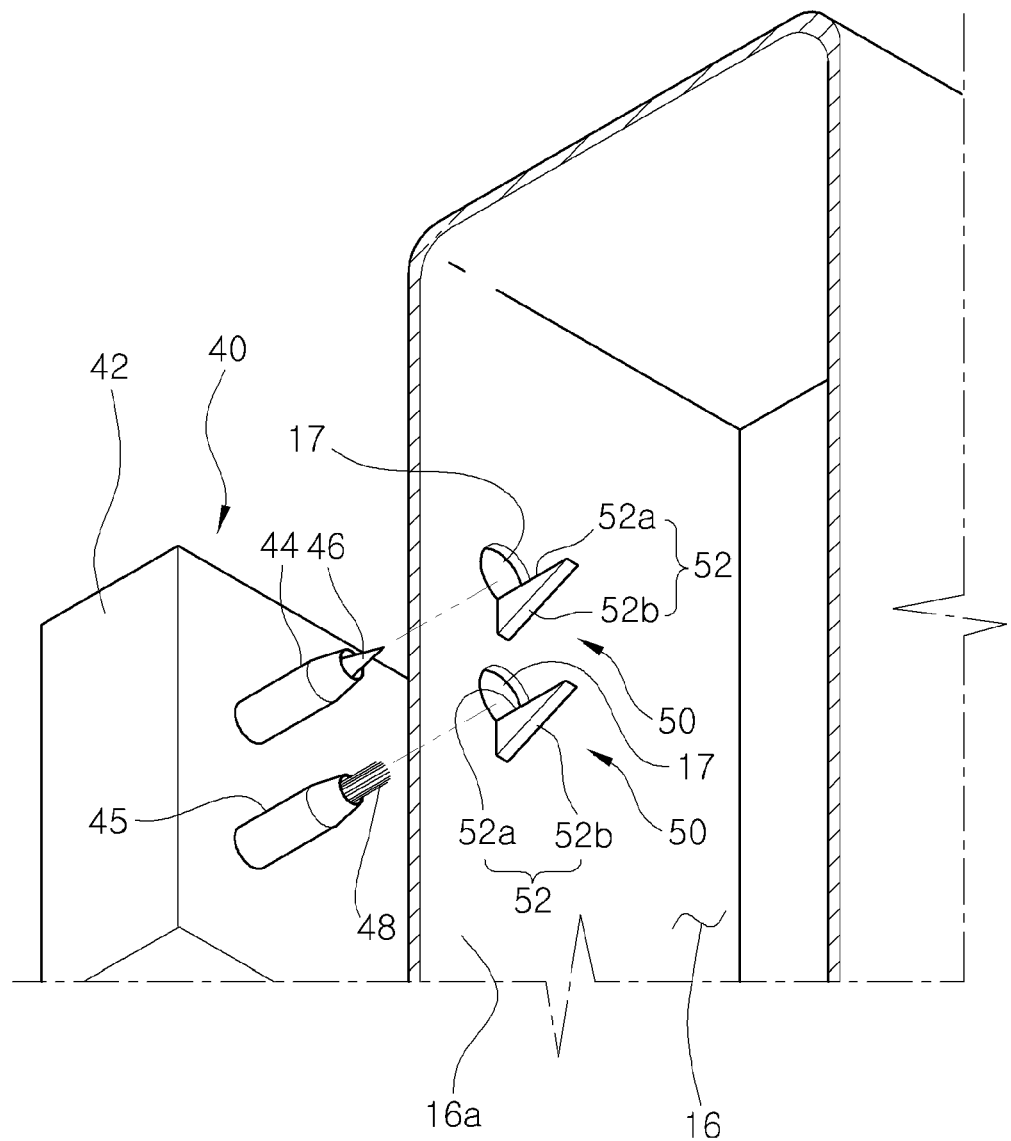

As a further alternative example, two water drainage ribs 52 may be arranged below the bottom surfaces 44a and 45a of the first and second protection pipes 44 and 45 as illustrated in FIG. 10. In this case, it is possible to drain the whole moisture condensed in and around the first and second protection pipes 44 and 45.

Second Embodiment

Figure 11:
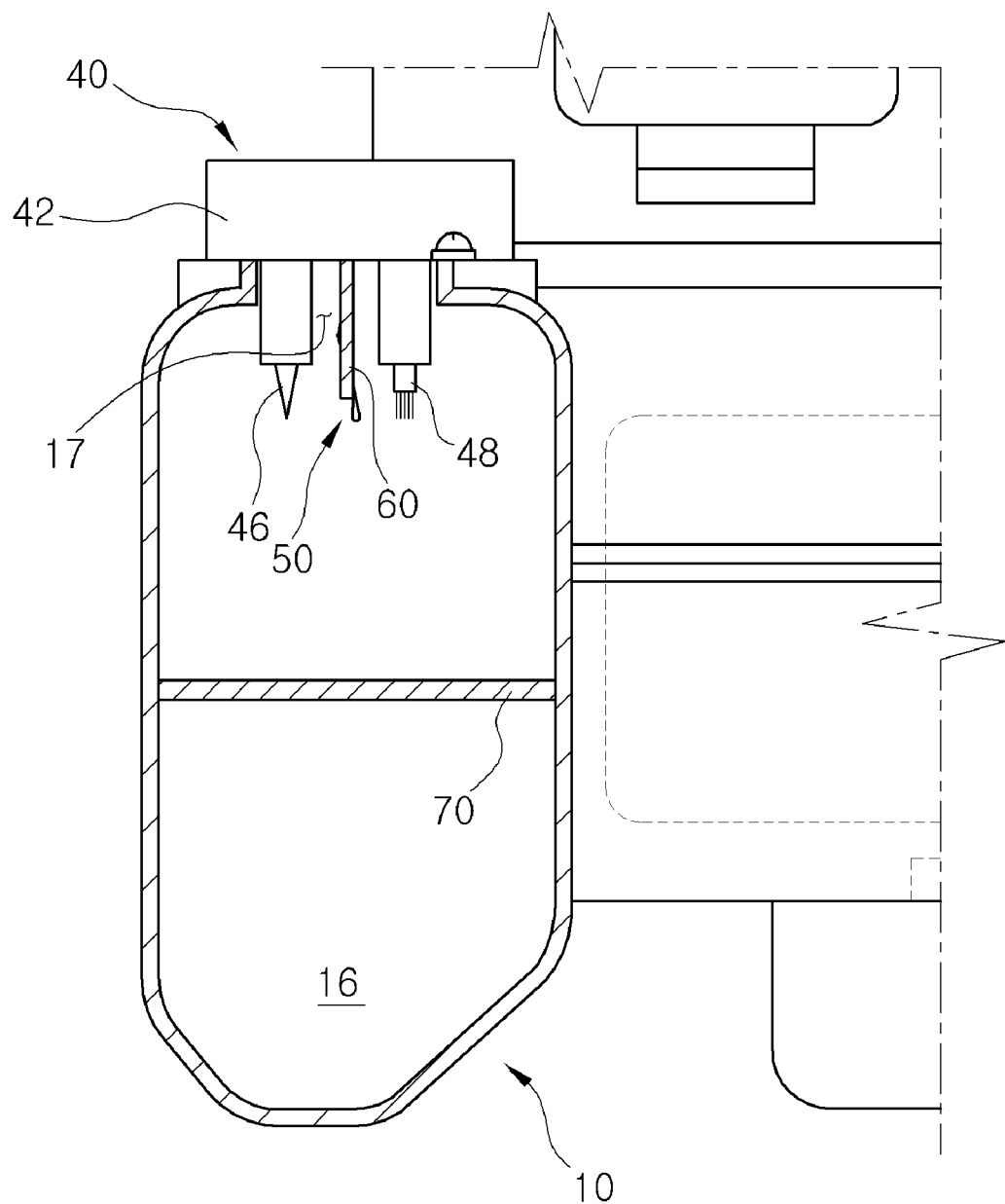
FIGS. 11 and 12 are section and bottom perspective views showing a second embodiment of a means for preventing electric short between first and second discharge electrodes.
Figure 12:
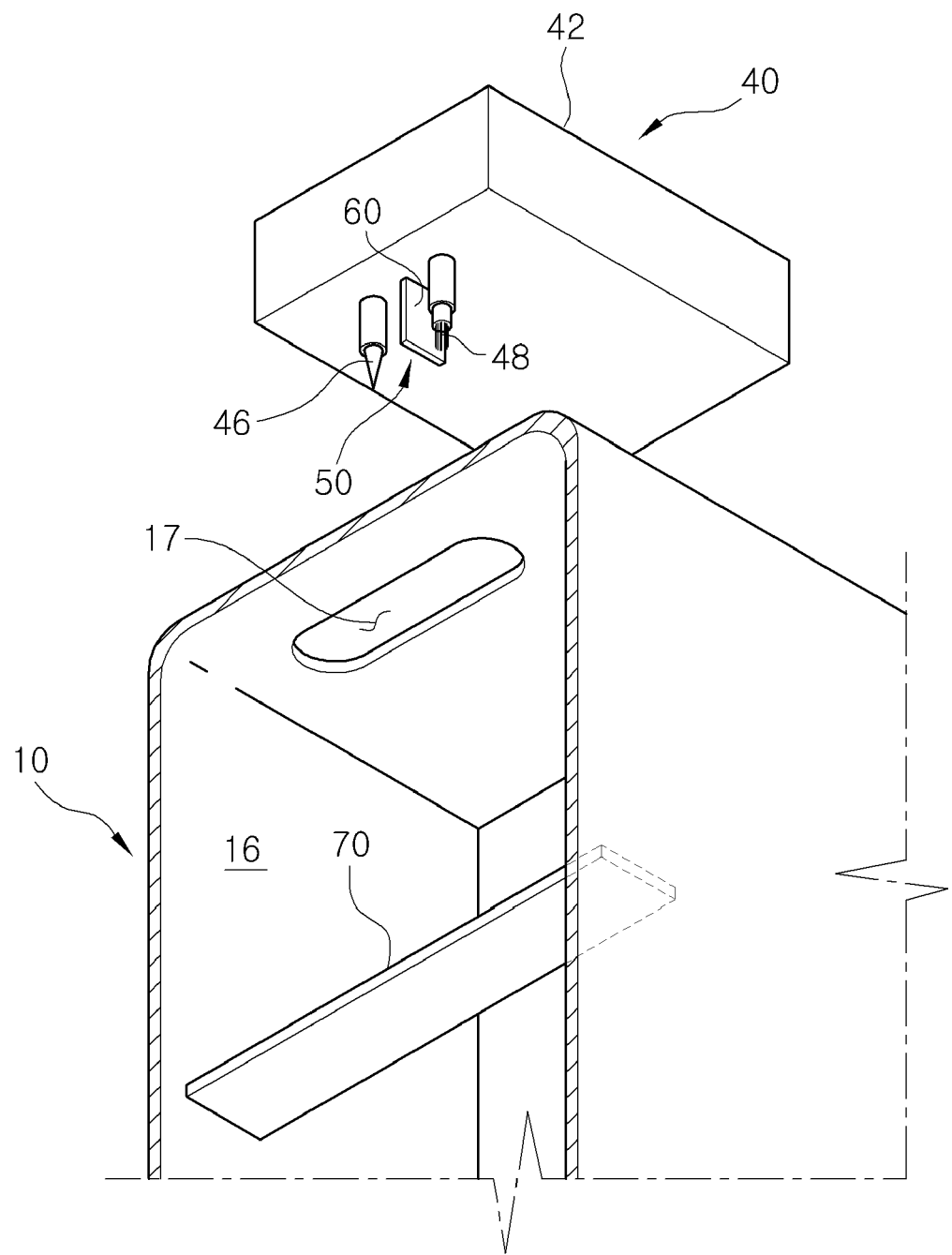

Referring next to FIGS. 11 and 12, there is shown a second embodiment of the electric short preventing means 50. The electric short preventing means 50 of the second embodiment is useful in case where the ionizer 40 is installed in a ceiling wall 16b of the internal passageway 16. The electric short preventing means 50 includes an isolation baffle 60 arranged between the first and second discharge electrodes 46 and 48.

The isolation baffle 60 is integrally formed with the bottom surface of the main body 42 of the ionizer 40. The isolation baffle 60 is inserted through a through-hole 17 of the air conditioning case 10 together with the first and second discharge electrodes 46 and 48 so that it can protrude into the internal passageway 16.

The isolation baffle 60 is formed in parallel with an air flow direction so as not to hinder the flow of air in the internal passageway 16. The isolation baffle 60 extends in a gravitational direction to downwardly guide and drain the moisture which would otherwise flow between the first and second discharge electrodes 46 and 48.

Owing to the fact that the isolation baffle 60 is designed to isolate the first and second discharge electrodes 46 and 48 from each other, it is possible to restrain the condensed moisture from flowing between the first and second discharge electrodes 46 and 48.

This prevents formation of a water film between the first and second discharge electrodes 46 and 48. As a result, it is possible to prevent electric short between the first and second discharge electrodes 46 and 48, which would otherwise generate a spark between the first and second discharge electrodes 46 and 48 and a discharge noise.

Furthermore, since the isolation baffle 60 is designed to downwardly drain the condensed moisture existing between the first and second discharge electrodes 46 and 48, it is possible to effectively prevent formation of a water film between the first and second discharge electrodes 46 and 48, which would otherwise cause electric short between the first and second discharge electrodes 46 and 48.

Figure 13:
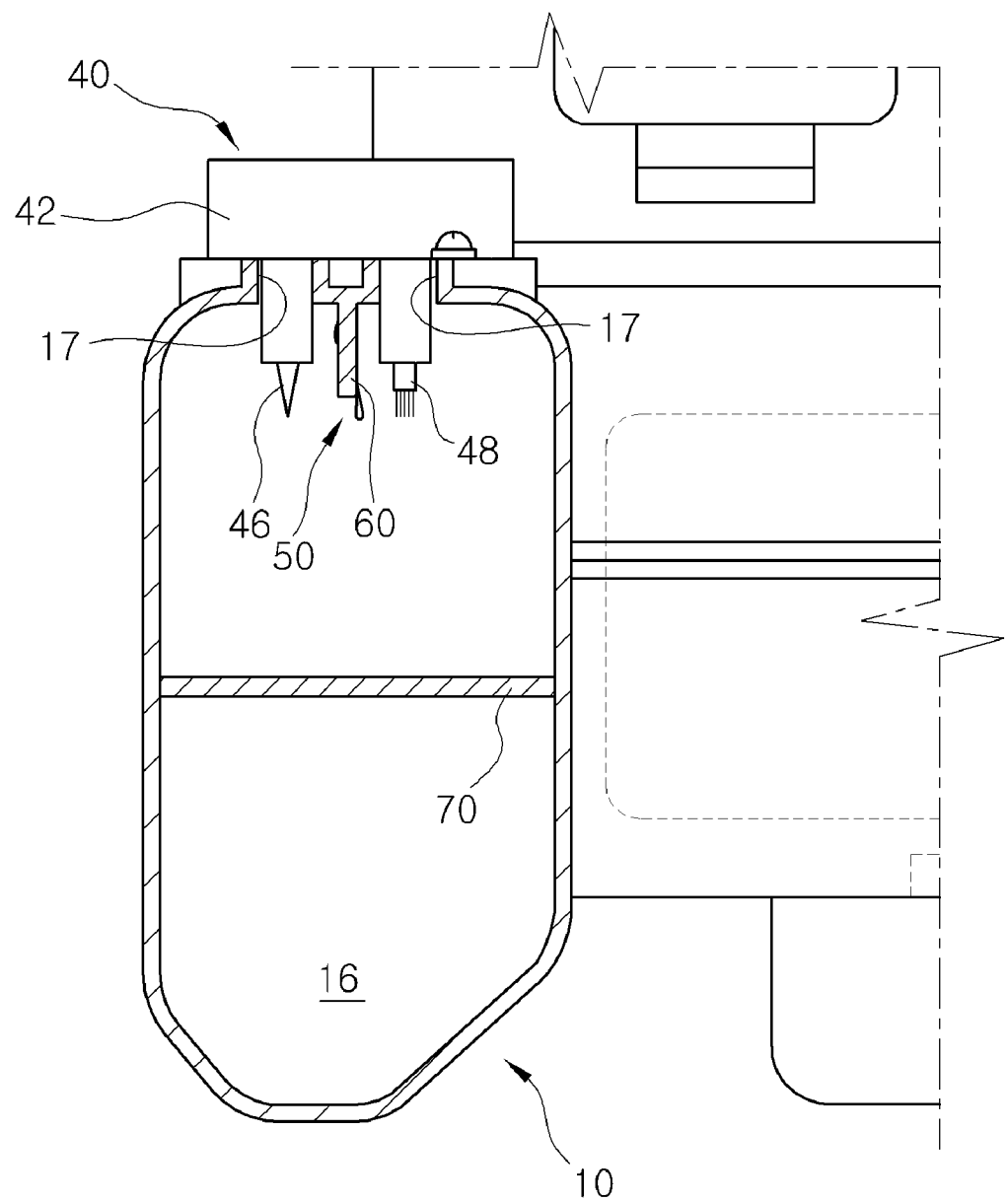
FIGS. 13 and 14 are section and bottom perspective views showing a modified example of an isolation baffle that constitutes the means for preventing electric short between first and second discharge electrodes in accordance with the second embodiment.
Figure 14:
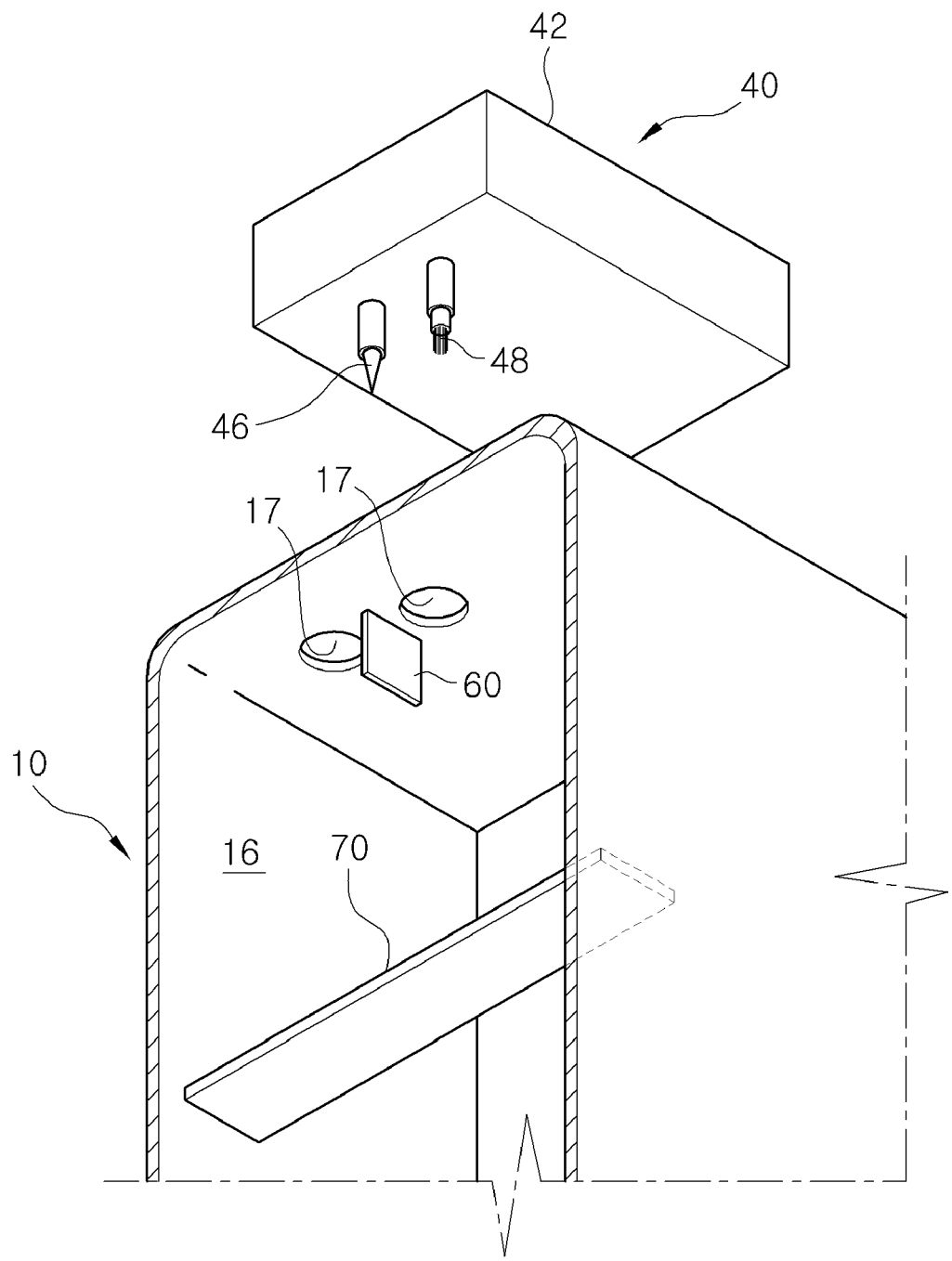

Referring next to FIGS. 13 and 14, there is shown a modified example of the isolation baffle 60. The isolation baffle 60 of the modified example is installed in the air conditioning case 10 so that it can be arranged between the first and second discharge electrodes 46 and 48. The isolation baffle 60 extends from the ceiling of the air conditioning case 10 into the internal passageway 16.

In the same manner as described above, the isolation baffle 60 of the modified example restrains the condensed moisture from flowing between the first and second discharge electrodes 46 and 48. This prevents formation of a water film between the first and second discharge electrodes 46 and 48. Accordingly, it is possible to prevent electric short between the first and second discharge electrodes 46 and 48, which would otherwise generate a spark between the first and second discharge electrodes 46 and 48 and a discharge noise.

In particular, the isolation baffle 60 of the modified example is formed in parallel with an air flow direction so as not to hinder the flow of air in the internal passageway 16. The isolation baffle 60 extends in a gravitational direction to downwardly guide and drain the moisture which would otherwise flow between the first and second discharge electrodes 46 and 48.

Third Embodiment

Figure 15:
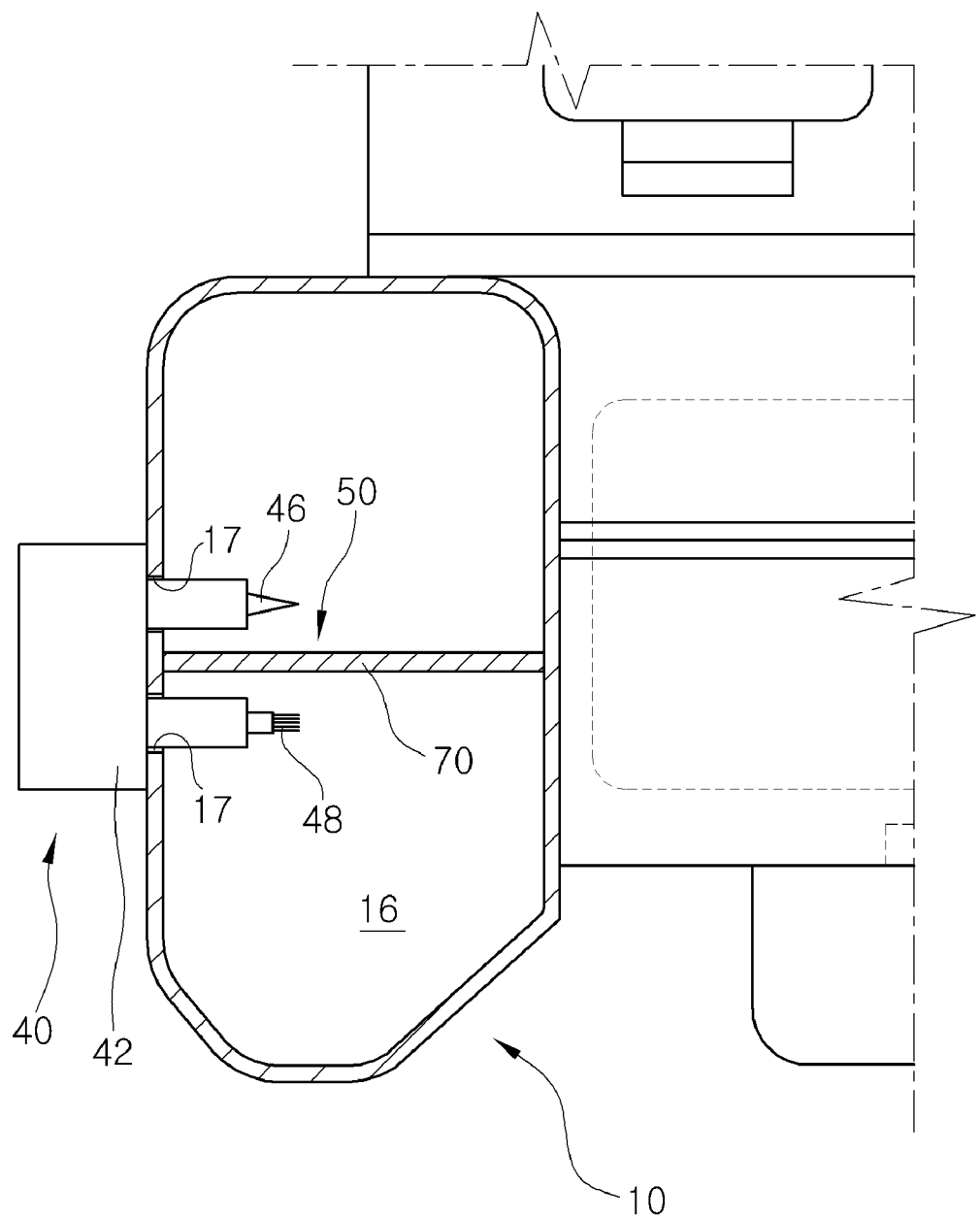
FIGS. 15 and 16 are section and bottom perspective views showing a third embodiment of a means for preventing electric short between first and second discharge electrodes.
Figure 16:
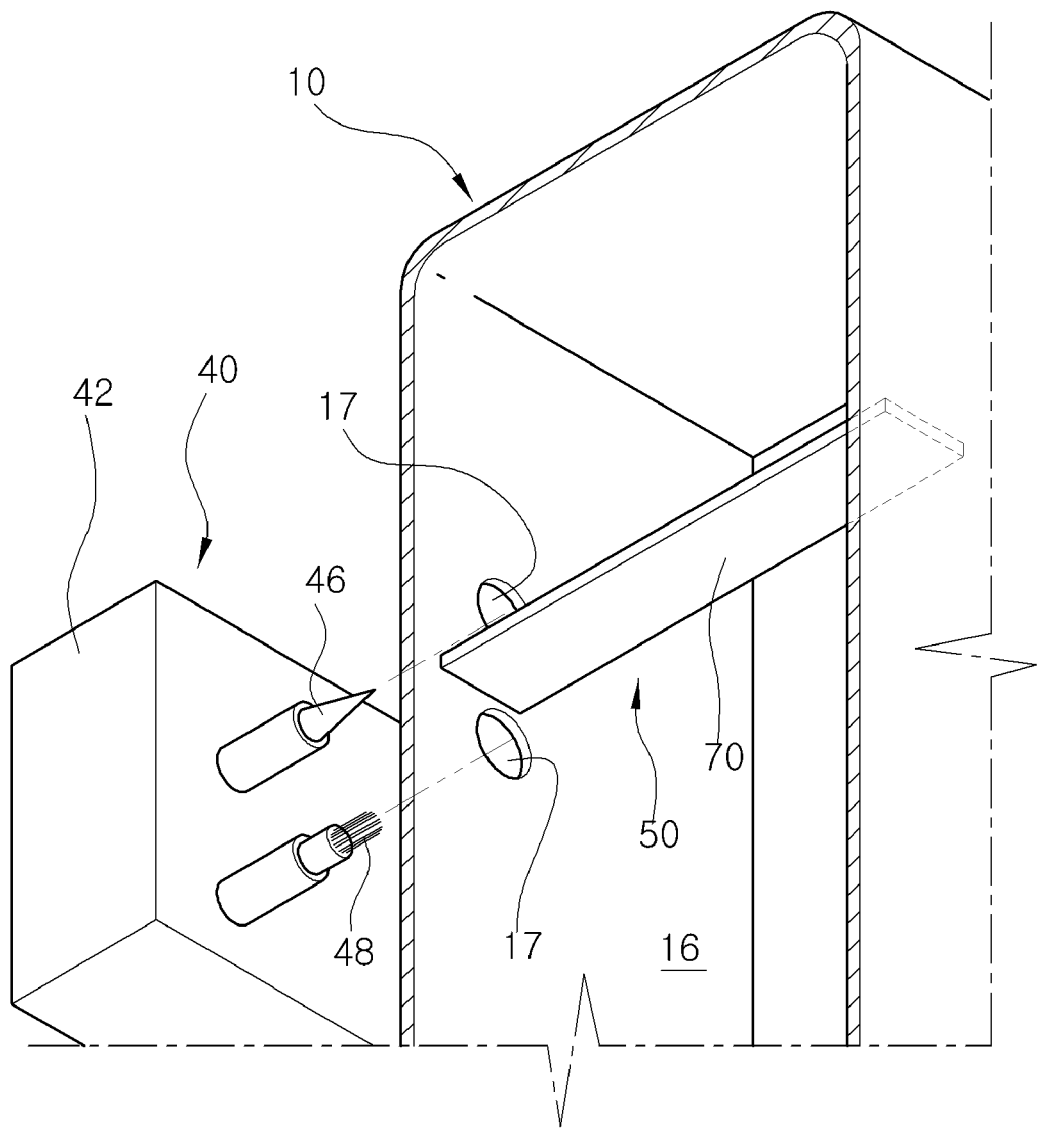

Referring next to FIGS. 15 and 16, there is shown a third embodiment of the electric short preventing means 50. The electric short preventing means 50 of the third embodiment includes a reinforcing rib 70 formed in the reinforcing rib 70 between the first and second discharge electrodes 46 and 48.

The reinforcing rib 70 is formed across the internal passageway 16 so as to reinforce the air conditioning case 10. The reinforcing rib 70 is arranged to isolate the first and second discharge electrodes 46 and 48 from each other, thereby restraining the condensed moisture from flowing between the first and second discharge electrodes 46 and 48.

This prevents formation of a water film between the first and second discharge electrodes 46 and 48. As a result, it is possible to prevent electric short between the first and second discharge electrodes 46 and 48, which would otherwise generate a spark between the first and second discharge electrodes 46 and 48 and a discharge noise.

In order for the reinforcing rib 70 to be used as the electric short preventing means 50, there is a need to install the ionizer 40 in alignment with the reinforcing rib 70. In other words, the ionizer 40 needs to be mounted to the air conditioning case 10 in such a manner that the first and second discharge electrodes 46 and 48 are arranged on the opposite sides of the reinforcing rib 70.

In this way, the electric short preventing means 50 of the third embodiment makes use of the reinforcing rib 70 already formed with the air conditioning case 10. This eliminates the need to provide an additional component for isolating the first and second discharge electrodes 46 and 48 from each other. Therefore, it is possible to save the costs involved in installing the electric short preventing means 50.

Fourth Embodiment

Figure 17:
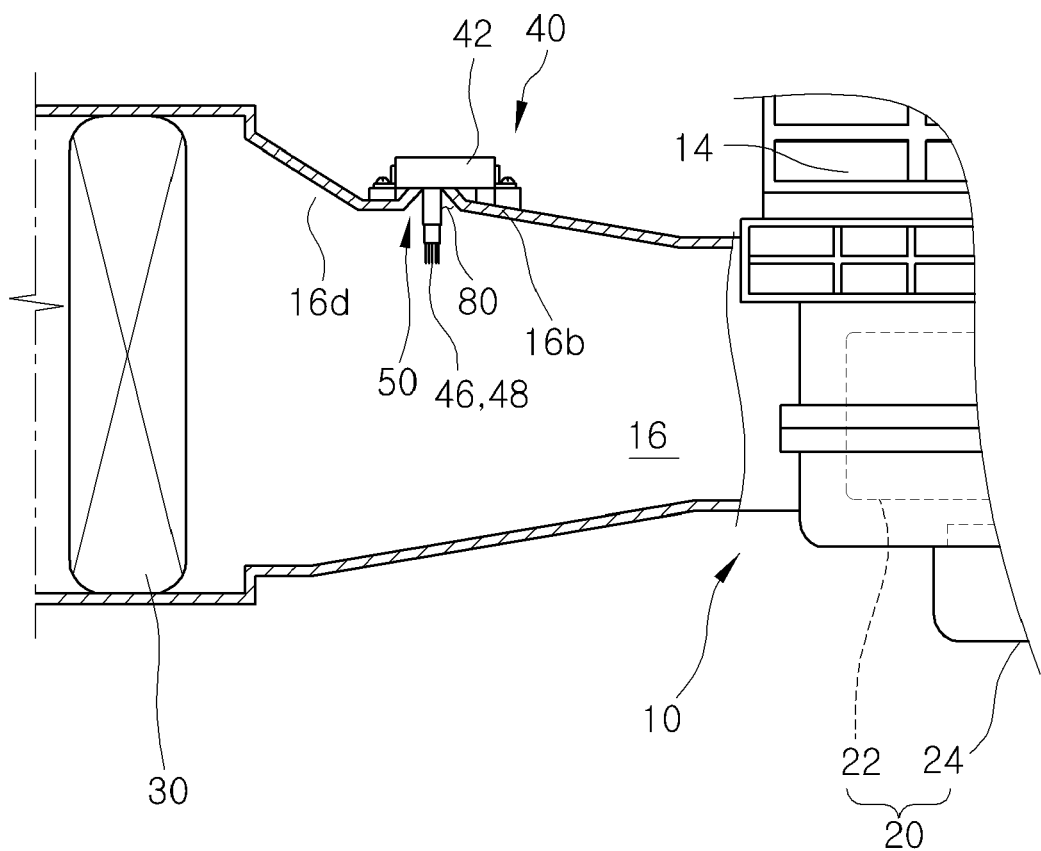
FIGS. 17 and 18 are section and bottom perspective views showing a fourth embodiment of a means for preventing electric short between first and second discharge electrodes.
Figure 18:
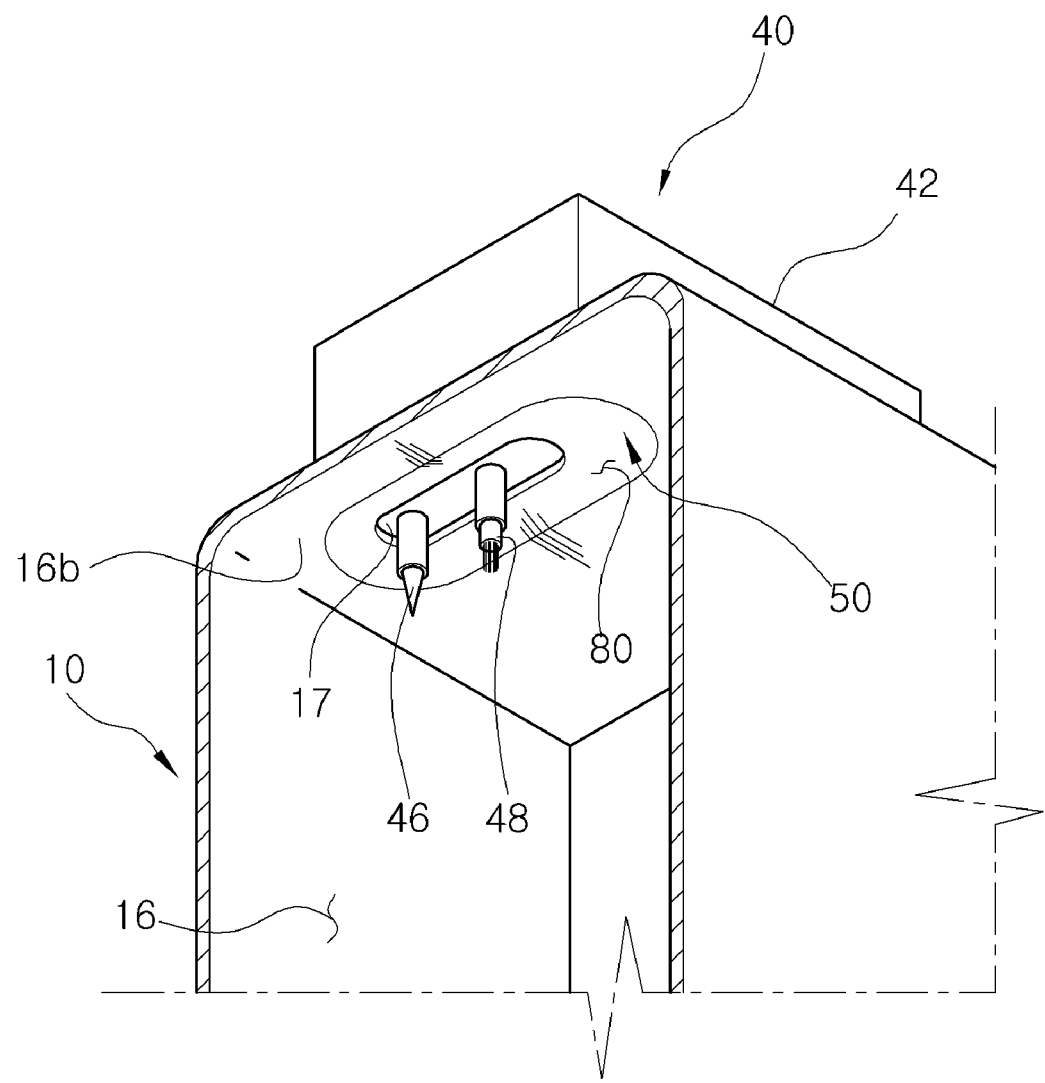

Referring next to FIGS. 17 and 18, there is shown a fourth embodiment of the electric short preventing means 50. The electric short preventing means 50 of the fourth embodiment is useful in case where the ionizer 40 is installed in the ceiling wall 16b of the internal passageway 16. The electric short preventing means 50 includes a moisture isolation recess 80 formed in the ceiling wall 16b to surround the first and second discharge electrodes 46 and 48.

The moisture isolation recess 80 is formed by upwardly indenting the ceiling wall 16b around an electrode insertion slot 17. The moisture isolation recess 80 has a bottom surface positioned higher than the surface of the ceiling wall 16b. Thus, the moisture isolation recess 80 serves to restrain the moisture from flowing from the remaining region of the ceiling wall 16b toward the first and second discharge electrodes 46 and 48.

This prevents the moisture condensed in the ceiling wall 16b from flowing toward the first and second discharge electrodes 46 and 48, thereby avoiding formation of a water film between the first and second discharge electrodes 46 and 48. As a result, it is possible to prevent electric short between the first and second discharge electrodes 46 and 48, which would otherwise generate a spark between the first and second discharge electrodes 46 and 48 and a discharge noise.

It is preferred that the ceiling wall 16b on which the moisture isolation recess 80 is formed extends along a generally horizontal plane. This is to prevent the condensed moisture existing in an inclined ceiling wall 16d from flowing toward the ceiling wall 16b on which the moisture isolation recess 80 is formed. Therefore, it is possible to restrain the condensed moisture from flowing from the inclined ceiling wall 16d toward the first and second discharge electrodes 46 and 48.

Fifth Embodiment

Figure 19:
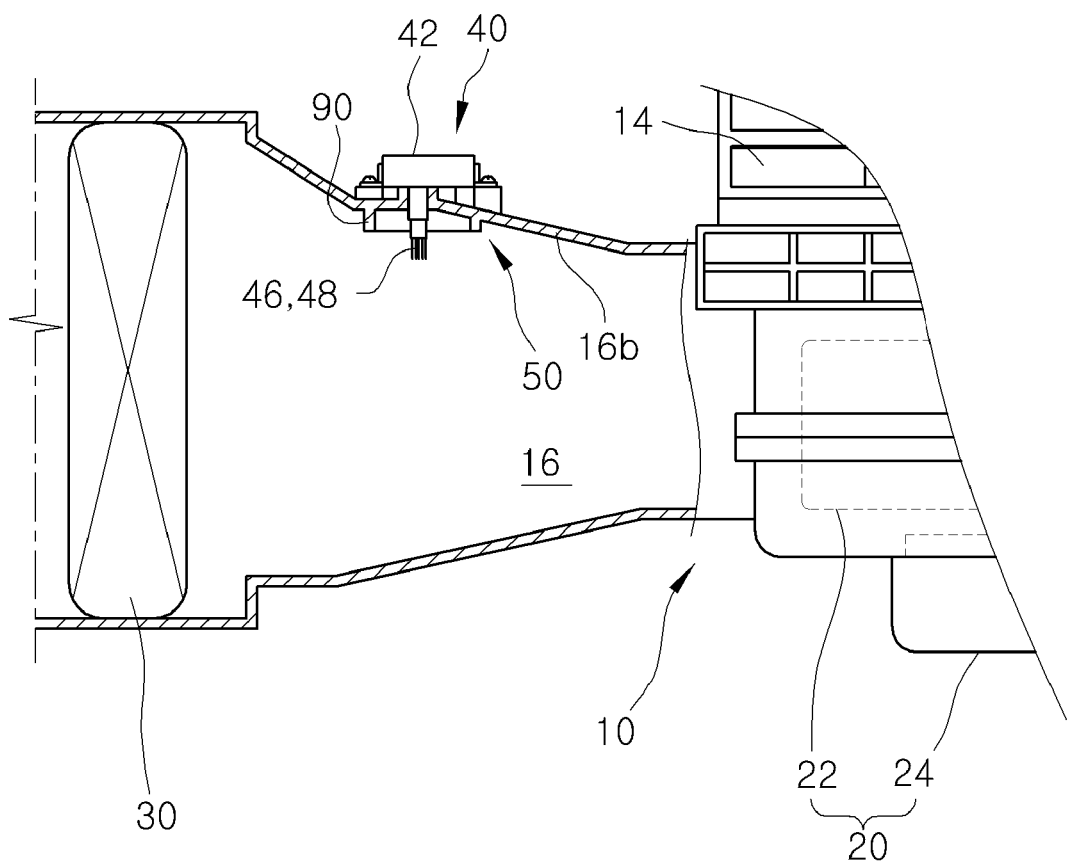
FIGS. 19 and 20 are section and bottom perspective views showing a fifth embodiment of a means for preventing electric short between first and second discharge electrodes.
Figure 20:
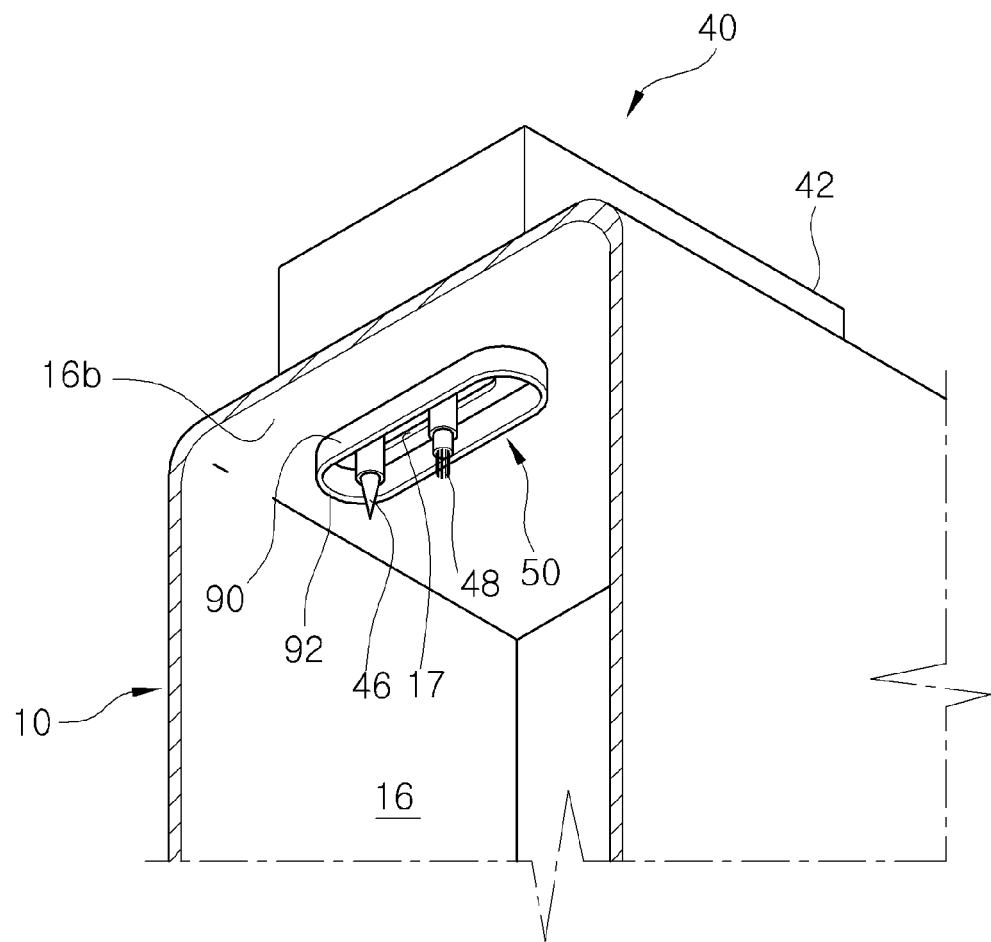

Referring next to FIGS. 19 and 20, there is shown a fifth embodiment of the electric short preventing means 50. The electric short preventing means 50 of the fifth embodiment is useful in cases where the ionizer 40 is installed in the ceiling wall 16b of the internal passageway 16. The electric short preventing means 50 includes a moisture isolation wall 90 formed around the first and second discharge electrodes 46 and 48.

The moisture isolation wall 90 is integrally formed with the air conditioning case 10 in such a fashion that the tip end 92 thereof can face toward the bottom surface of the internal passageway 16. The moisture isolation wall 90 serves to downwardly guide and drain the moisture condensed in the ceiling wall 16b of the internal passageway 16. This prevents the moisture from flowing toward the first and second discharge electrodes 46 and 48, thereby keeping the moisture from infiltrating into the first and second discharge electrodes 46 and 48.

Consequently, this makes it possible to avoid formation of a water film between the first and second discharge electrodes 46 and 48. As a result, it is possible to prevent electric short between the first and second discharge electrodes 46 and 48, which would otherwise generate a spark between the first and second discharge electrodes 46 and 48 and a discharge noise.

Sixth Embodiment

Figure 21:
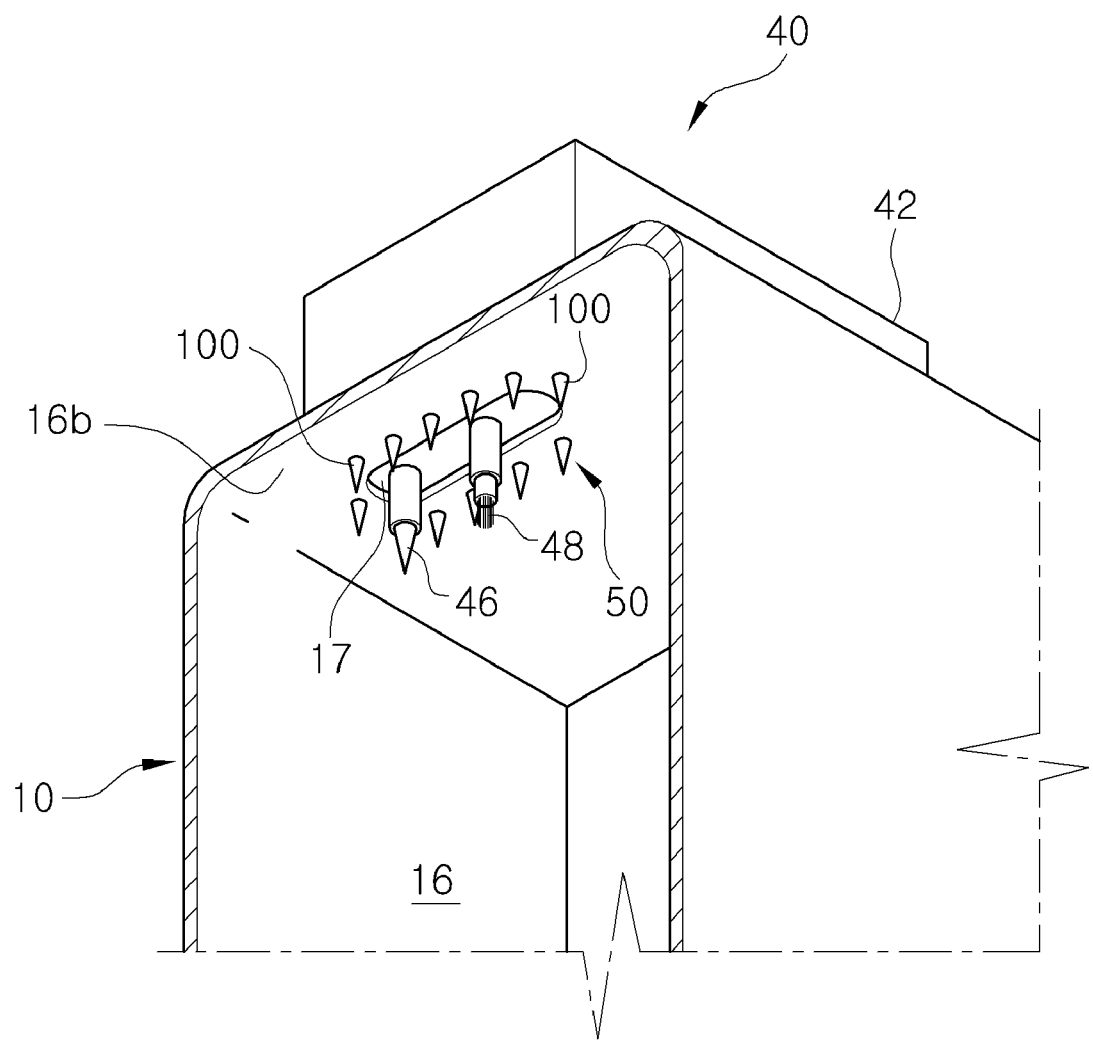
FIG. 21 is a bottom perspective view showing a sixth embodiment of a means for preventing electric short between first and second discharge electrodes.

Referring next to FIG. 21, there is shown a sixth embodiment of the electric short preventing means 50. The electric short preventing means 50 of the sixth embodiment includes a plurality of water drainage protrusions 100 arranged around the first and second discharge electrodes 46 and 48. Each of the water drainage protrusions 100 protrudes in a gravitational direction.

Each of the water drainage protrusions 100 is integrally formed with the air conditioning case 10 in such a fashion that the tip end thereof can face toward the bottom surface of the internal passageway 16.

The water drainage protrusions 100 serve to downwardly guide and drain the moisture condensed in the ceiling wall 16b of the internal passageway 16. This prevents the moisture from flowing toward the first and second discharge electrodes 46 and 48, thereby keeping the moisture from infiltrating into the first and second discharge electrodes 46 and 48.

While certain preferred embodiments of the invention have been described hereinabove, the present invention is not limited to these embodiments. It is to be understood that various changes and modifications may be made without departing from the scope of the invention defined in the claims.

What is claimed is:

1. An air conditioning system for automotive vehicles, comprising:
   an air conditioning case having an internal passageway;
   an ionizer for emitting positive ions and negative ions into the internal passageway of the air conditioning case, the ionizer including a main body and first and second discharge electrodes extending from the main body into the internal passageway in a spaced-apart relationship with each other; and
   an electric short preventing means for preventing moisture positioned in and around the first and second discharge electrodes from causing electric short between the first and second discharge electrodes.

2. The air conditioning system according to claim 1, wherein the electric short preventing means comprises a water drainage rib for draining the moisture positioned in and around the first and second discharge electrodes to prevent the electric short between the first and second discharge electrodes.

3. The air conditioning system according to claim 2, wherein the water drainage rib is adapted to drain the moisture positioned in and around a lower one of the first and second discharge electrodes.

4. The air conditioning system according to claim 3, wherein the water drainage rib is joined to a side wall of the internal passageway so that the moisture can be drained toward the side wall.

5. The air conditioning system according to claim 2, wherein the water drainage rib is integrally formed with the ionizer.

6. The air conditioning system according to claim 2, wherein the water drainage rib is integrally formed with the air conditioning case.

7. The air conditioning system according to claim 1, wherein the electric short preventing means comprises an isolation baffle for restraining the moisture from flowing between the first and second discharge electrodes to prevent the electric short between the first and second discharge electrodes.

8. The air conditioning system according to claim 7, wherein the isolation baffle is arranged between the first and second discharge electrodes and protrudes from the main body into the internal passageway.

9. The air conditioning system according to claim 7, wherein the isolation baffle is arranged between the first and second discharge electrodes and protrudes from the air conditioning case into the internal passageway.

10. The air conditioning system according to claim 7, wherein the isolation baffle is formed in parallel with an air flow direction and extends in a gravitational direction so that the moisture existing between the first and second discharge electrodes can be drained downwardly.

11. The air conditioning system according to claim 1, wherein the electric short preventing means comprises a reinforcing rib formed in the air conditioning case, the reinforcing rib arranged between the first and second discharge electrodes so that the reinforcing rib can restrain the moisture from flowing between the first and second discharge electrodes to prevent the electric short between the first and second discharge electrodes, the first and second discharge electrodes mounted to the air conditioning case on the both sides of the reinforcing rib.

12. The air conditioning system according to claim 1, wherein the electric short preventing means comprises a moisture isolation recess formed in the air conditioning case around the first and second discharge electrodes so that the moisture isolation recess can restrain the moisture from flowing toward the first and second discharge electrodes to prevent the electric short between the first and second discharge electrodes.

13. The air conditioning system according to claim 12, wherein the moisture isolation recess is formed by upwardly indenting the air conditioning case around the first and second discharge electrodes.

14. The air conditioning system according to claim 1, wherein the electric short preventing means comprises a moisture isolation wall formed around the first and second discharge electrodes so that the moisture isolation wall can restrain the moisture from flowing toward the first and second discharge electrodes to prevent the electric short between the first and second discharge electrodes.

15. The air conditioning system according to claim 14, wherein the moisture isolation wall is formed in the air conditioning case around the first and second discharge electrodes so that the moisture isolation wall can downwardly drain the moisture flowing toward the first and second discharge electrodes.

16. The air conditioning system according to claim 1, wherein the electric short preventing means comprises a plurality of water drainage protrusions formed around the first and second discharge electrodes so that the water drainage protrusions can restrain the moisture from flowing toward the first and second discharge electrodes to prevent the electric short between the first and second discharge electrodes.

* * * * *

UNITED STATES PATENT AND TRADEMARK OFFICE
CERTIFICATE OF CORRECTION

PATENT NO. : 7,749,313 B2
APPLICATION NO. : 12/101067
DATED : July 6, 2010
INVENTOR(S) : Sang Chul Byon et al.

It is certified that error appears in the above-identified patent and that said Letters Patent is hereby corrected as shown below:

Column 9,
Line 32, Claim 11, where "the both" should read --both--.

Signed and Sealed this
Eighth Day of March, 2011

David J. Kappos
*Director of the United States Patent and Trademark Office*